US012701252B2

(12) United States Patent
Liang et al.

(10) Patent No.: US 12,701,252 B2
(45) Date of Patent: Aug. 4, 2026

(54) DEVICE AND METHOD FOR AFFINE MOTION VECTOR PREDICTION USING NEIGHBORING INFORMATION

(71) Applicant: SHARP KABUSHIKI KAISHA, Sakai City (JP)

(72) Inventors: Kai-Wen Liang, Taipei (TW); Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/764,753

(22) Filed: Jul. 5, 2024

(65) Prior Publication Data

US 2025/0016344 A1    Jan. 9, 2025

Related U.S. Application Data

(60) Provisional application No. 63/525,000, filed on Jul. 5, 2023.

(51) Int. Cl.
    *H04N 19/44*      (2014.01)
    *H04N 19/137*     (2014.01)
    *H04N 19/176*     (2014.01)
(52) U.S. Cl.
    CPC .......... *H04N 19/44* (2014.11); *H04N 19/137* (2014.11); *H04N 19/176* (2014.11)
(58) Field of Classification Search
    CPC .... H04N 19/137; H04N 19/176; H04N 19/44; H04N 19/52
    See application file for complete search history.

(56) References Cited

U.S. PATENT DOCUMENTS

| | | | | |
|---|---|---|---|---|
| 2019/0342547 A1* | 11/2019 | Lee | ...................... | H04N 19/147 |
| 2020/0112725 A1* | 4/2020 | Huang | ................. | H04N 19/139 |
| 2020/0252644 A1* | 8/2020 | Lee | ...................... | H04N 19/52 |
| 2021/0127116 A1* | 4/2021 | Chen | ................... | H04N 19/139 |
| 2025/0330596 A1* | 10/2025 | Jia | ........................ | H04N 19/159 |

OTHER PUBLICATIONS

Peter De Rivaz, Argon Design Ltd et al., "AV1 Bitstream & Decoding Process Specification", Version 1.0.0 with Errata 1, Jan. 8, 2019.

(Continued)

*Primary Examiner* — Jessica M Prince

(74) *Attorney, Agent, or Firm* — ScienBiziP, P.C.

(57)     ABSTRACT

A method for decoding video data and an electronic device for performing the method are provided. The method receives the video data which includes multiple image frames. The method parses the video data to determine a first difference parameter for a first block unit within a current frame of the image frames. The method determines a first motion vector of the first block unit based on a first motion vector predictor of the first block unit, the first difference parameter, and motion vector information of one or more second block units within the current frame stored in the electronic device. The one or more second block units are adjacent to the first block unit. The method then reconstructs the first block unit based on the first motion vector and a reference frame included in the image frames.

12 Claims, 5 Drawing Sheets

100

(56) References Cited

OTHER PUBLICATIONS

Series H: Audiovisual and Multimedia Systems Infrastructure of audiovisual services—Coding of moving video, Versatile video coding, ITU-T H.266 (Apr. 2022).

Series H: Audiovisual and Multimedia Systems Infrastructure of audiovisual services—Coding of moving video, High efficiency video coding, ITU-T H.265 (Aug. 2021).

Muhammed Coban et al., "Algorithm description of Enhanced Compression Model 9 (ECM 9)", JVET-AD2025, Joint Video Experts Team (JVET) of ITU-T SG 16 WP 3 and ISO/IEC JTC 1/SC 29, 30th Meeting, Antalya, TR, Apr. 21-28, 2023.

Adrian Browne et al., "Algorithm description for Versatile Video Coding and Test Model 20 (VTM20)", JVET-AD2002-v1, Joint Video Experts Team (JVET) of ITU-T SG 16 WP 3 and ISO/IEC JTC 1/SC 29, 30th Meeting, Antalya, TR, Apr. 21-28, 2023.

Jianle Chen et al., "Algorithm Description of Joint Exploration Test Model 7 (JEM 7)", JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017.

* cited by examiner

DEVICE AND METHOD FOR AFFINE MOTION VECTOR PREDICTION USING NEIGHBORING INFORMATION

CROSS-REFERENCE TO RELATED APPLICATION(S)

The present disclosure claims the benefit of and priority to U.S. Provisional Patent Application Ser. No. 63/525,000, filed on Jul. 5, 2023, entitled "PROPOSED AFFINE MOTION COMPENSATION PREDICTION METHOD," the content of which is hereby incorporated herein fully by reference in its entirety into the present disclosure for all purposes.

FIELD

The present disclosure is generally related to video coding and, more specifically, to techniques for motion compensation predictions.

BACKGROUND

Motion vector prediction is a cornerstone of video compression technology, fundamental to standards such as high efficiency video coding (HEVC) and versatile video coding (VVC). This technique reduces the data needed to represent motion by predicting the movement of blocks between frames, thereby enhancing compression efficiency and maintaining video quality at lower bit rates.

Traditionally, motion vectors have been used to represent simple translational motion. However, this approach is inadequate for complex motion scenarios involving rotation, scaling, and skewing. To overcome this limitation, the affine advanced motion vector prediction (AMVP) mode was introduced. The affine AMVP mode uses affine transformations to model the complex motions more accurately, leveraging a set of parameters to describe the motion and thereby improving the prediction precision and the overall compression efficiency.

Improving the signaling mechanism for parameters in the affine AMVP mode is crucial for maximizing compression benefits. Efficient signaling reduces the redundancy, thereby minimizing the bit rates and enhancing the overall compression efficiency.

In conclusion, enhancing the signaling mechanism for the affine AMVP mode is essential for advancing the video compression technology. This improvement addresses the key challenge of reducing the overhead while maintaining the prediction accuracy, aligning with the ongoing efforts in the field to develop more efficient and effective signaling methods.

SUMMARY

The present disclosure is directed to a device and method for motion compensation predictions, aimed at achieving a more compact representation of motion information.

In a first aspect of the present disclosure, a method for decoding video data and an electronic device for performing the method are provided. The method includes receiving the video data that includes multiple image frames; parsing the video data to determine a first difference parameter for a first block unit within a current frame included in the image frames; determining a first motion vector of the first block unit based on a first motion vector predictor of the first block unit, the first difference parameter, and motion vector information of one or more second block units within the current frame stored in the electronic device, where the one or more second block units are adjacent to the first block unit; and reconstructing the first block unit based on the first motion vector and a reference frame included in the image frames.

In an implementation of the first aspect, the method further includes: parsing the video data to determine a second difference parameter for the first block unit within the current frame; determining a second motion vector of the first block unit based on a second motion vector predictor of the first block unit, the first difference parameter, the second difference parameter, and the motion vector information; and reconstructing the first block unit based on the first motion vector, the second motion vector, and the reference frame.

In another implementation of the first aspect, one of the one or more second block units is coded in an affine advanced motion vector prediction (AMVP) mode, and determining the first motion vector of the first block unit includes calculating the first motion vector of a first control point of the first block unit based on the first motion vector predictor, the first difference parameter and a first motion vector residual of a second control point of the one of the one or more second block units. The second control point is associated with the first control point, and the first motion vector residual includes a difference between a motion vector of the second control point and a motion vector predictor of the second control point.

In another implementation of the first aspect, the first difference parameter includes a difference between a second motion vector residual of the first control point of the first block unit and the first motion vector residual.

In another implementation of the first aspect, determining the first motion vector of the first block unit further includes: parsing the video data to determine an index; and selecting the one of the one or more second block units based on the index.

In another implementation of the first aspect, determining the first motion vector of the first block unit further includes: determining whether each of the one or more second block units is coded in the affine AMVP mode based on a predefined order; and selecting the one of the one or more second block units that is first determined to be coded in the affine AMVP mode.

In another implementation of the first aspect, in a case that none of the one or more second block units is coded in an affine advanced motion vector prediction (AMVP) mode, determining the first motion vector of the first block unit further includes: calculating the first motion vector based on the first motion vector predictor, the first difference parameter, and one or more reference motion vectors of the one or more second block units.

In another implementation of the first aspect, the first difference parameter includes a difference between a second motion vector residual of the first control point of the first block unit and one of the one or more reference motion vectors.

In another implementation of the first aspect, the first difference parameter includes a difference between a second motion vector residual of the first control point of the first block unit and a statistical measure of the one or more reference motion vectors.

In another implementation of the first aspect, the method further includes: determining that the first block unit is coded in an affine advanced motion vector prediction (AMVP) mode.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DETAILED DESCRIPTION

Figure 1:
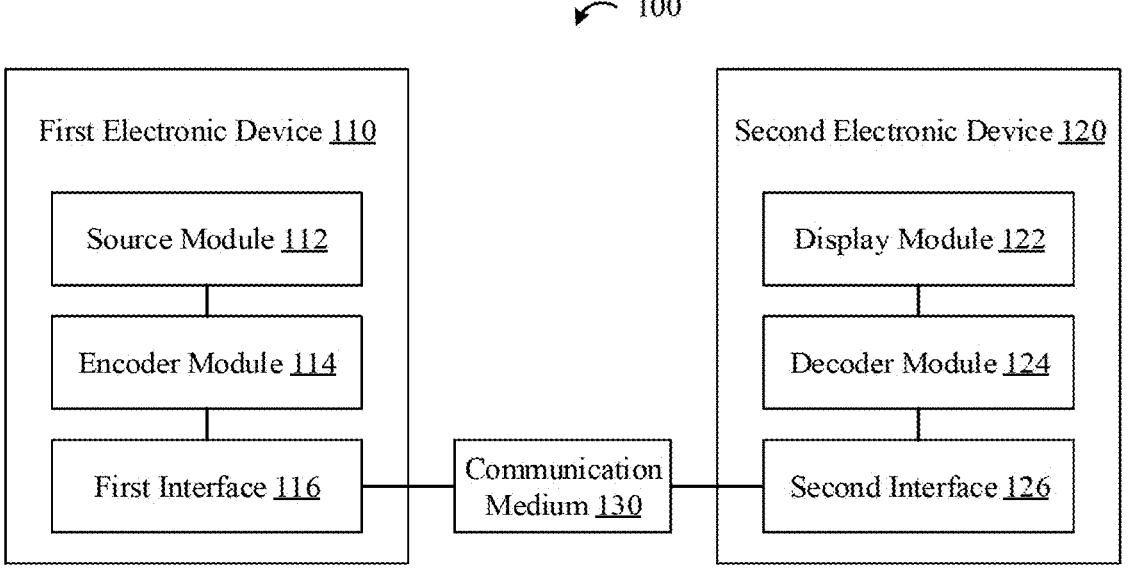
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The present disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of wellknown methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
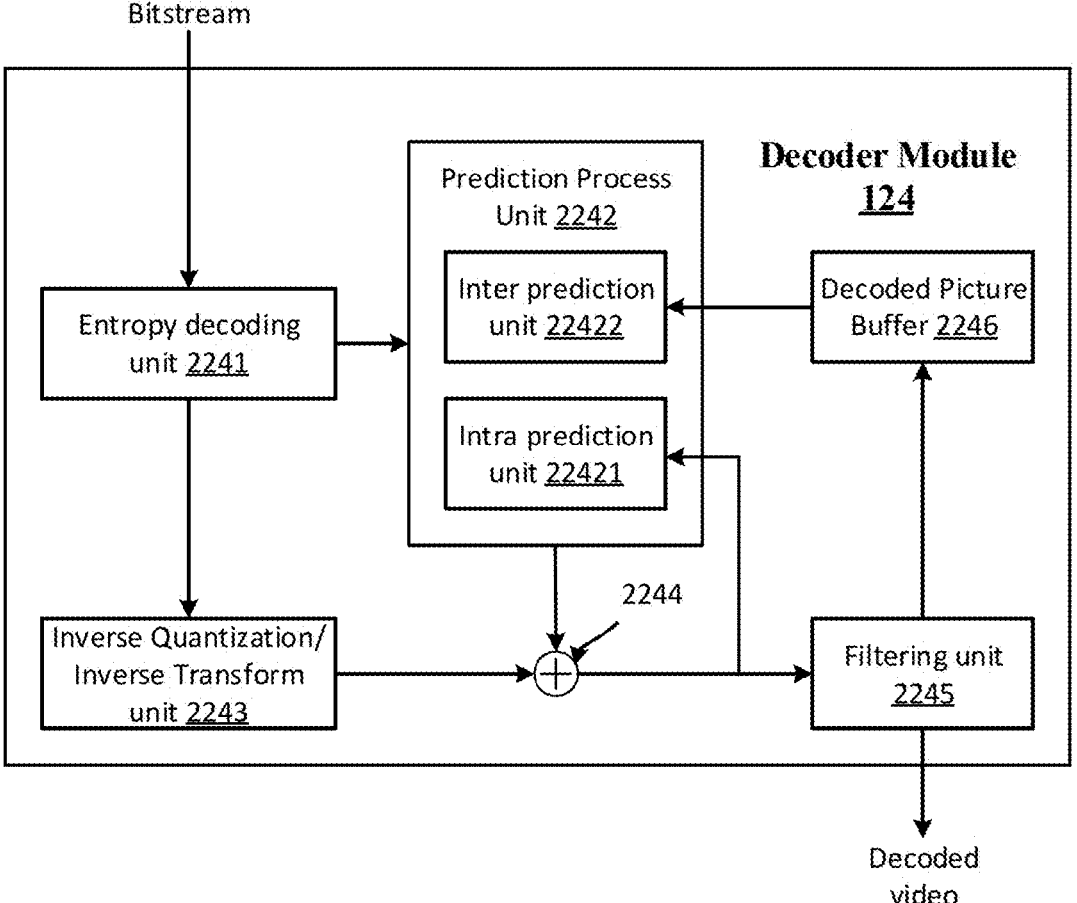
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block.

The motion vector may indicate a displacement of the current block unit within the current image block relative to a reference block unit within the reference image block. The reference block unit may be a block determined to closely match the current block unit.

The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (which are not explicitly illustrated for the brevity of description) may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any one of a variety of memory devices, such as a dynamic random-access memory (DRAM), including synchronous DRAM (SDRAM), magneto-resistive RAM (MRAM), resistive RAM (RRAM), or other types of memory devices. The decoded picture buffer 2246 may be on-chip along with other components of the decoder module 124 or may be off-chip relative to those components.

Figure 3:
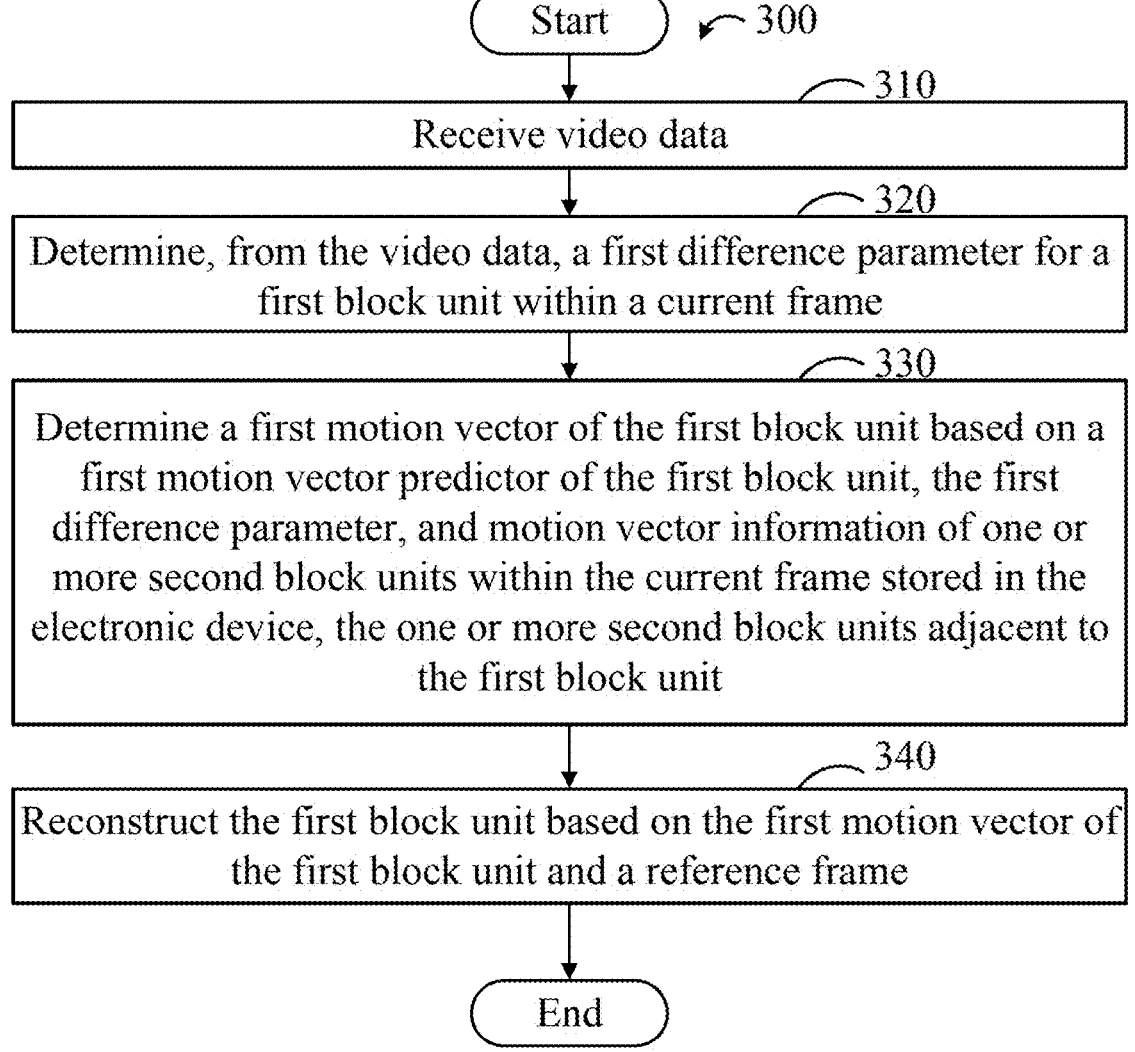
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there may be a variety of methods of decoding the video data.

The method/process 300 may be performed by an electronic device using the configurations illustrated in FIGS. 1 and 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus may be different from what is illustrated. Additional blocks may be added or fewer blocks may be utilized without departing from the scope of the present disclosure.

At block 310, the method/process 300 may start by receiving (e.g., by the decoder module 124) the video data. The video data received by the decoder module 124 may include a bitstream provided by the encoder module 114, which may include information of multiple image frames.

With reference to FIG. 1 and FIG. 2, the second electronic device 120 may receive the bitstream from an encoder, such as the first electronic device 110, or from other video providers, via the second interface 126. The second interface 126 may provide the bitstream to the decoder module 124.

The entropy decoding unit 2241 may decode the bitstream to determine multiple prediction indications and multiple partitioning indications for multiple video images. Then, the decoder module 124 may further reconstruct the multiple video images based on the prediction indications and the partitioning indications. The prediction indications and the partitioning indications may include multiple flags and multiple indices.

With reference to FIG. 1 and FIG. 2, the decoder module 124 may determine the image frames based on the bitstream and may divide each image frame to determine the block units according to the partition indications in the bitstream. For example, the decoder module 124 may divide the image frames to generate multiple CTUs, and further divide one of the CTUs to determine the block units according to the partition indications based on any video coding standard.

At block 320, the process 300 may determine (e.g., by the decoder module 124), from the video data, one or more difference parameters for a first block unit within a current frame. The current frame may be a frame included in the multiple image frames, and the first block unit may be a block unit determined based on the partition indications, as described above. The one or more difference parameters for the first block unit may be stored in the electronic device 120 (e.g., in the decoded picture buffer 2246) for reconstructing the subsequent block units.

The decoder module 124 may read and parse the video data to determine the mode information for each block from the bitstream. The mode information may specify a prediction mode selected by the encoder for the first block unit, such as a motion vector prediction (MVP) mode, an affine advanced motion vector prediction (AMVP) mode, etc.

In some implementations, the decoder module 124 may determine that the first block unit is coded in the affine AMVP mode.

Figure 4:
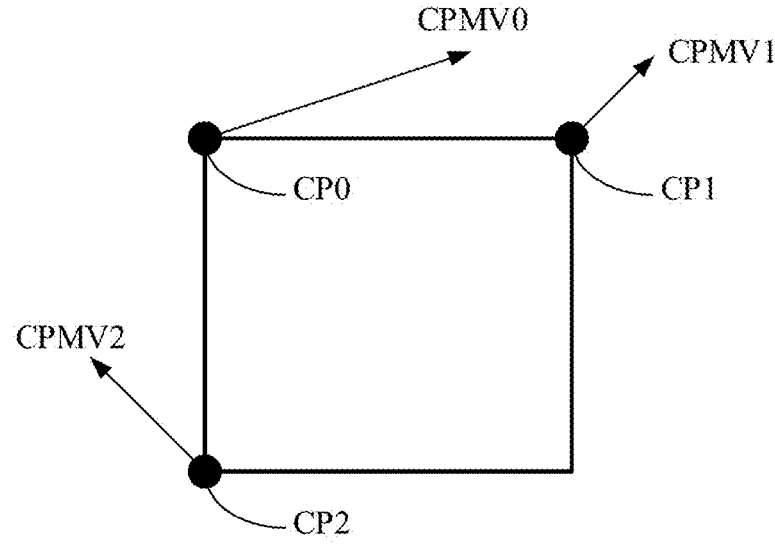
FIG. 4 is a schematic diagram illustrating an affine advanced motion vector prediction mode, in accordance with one or more example implementations of this disclosure.

FIG. 4 is a schematic diagram illustrating an affine AMVP mode, in accordance with one or more example implementations of this disclosure.

With reference to FIG. 4, the affine AMVP mode uses the motion vectors (may also be referred to as control point motion vectors and may be denoted as CPMVi) of the control points (may be denoted as CPi) to derive an affine model in a block unit (e.g., the first block unit). For a 4-parameter affine model, the number of control points may be 2 (e.g., i is 0 or 1). For a 6-parameter affine model, the number of control points may be 3 (e.g., i is 0, 1, or 2). The present disclosure does not limit the type of the selected affine model.

It should be noted that, in the implementations of the present disclosure, as shown in FIG. 4, i=0 corresponds to a control point CP0 at the top-left corner of the block unit, i=1 corresponds to a control point CP1 at the top-right corner of the block unit, and i=2 corresponds to a control point CP2 at the bottom-left corner of the block unit. In other words, two denotations (e.g., MvdCpi and MvdCpi$_{neig}$) for two block units with the same "i" may be interpreted as each of the two denotations being associated with the corresponding position in the two block units. The present disclosure is, however, not limited to these specific positions of the control points.

In order to determine the CPMVi of the first block unit, the decoder module 124 may determine the motion vector predictors (denoted as CPMVPi) of the control points in advance.

In some implementations, the decoder module 124 may establish a candidate list for the CPMVPi of the first block unit, each candidate in the candidate list may include multiple sets of CPMVPi (e.g., i=0, 1 or i=0, 1, 2). The mode information may further include an index for determining a candidate from the candidate list. Once the candidate is determined, a set of CPMVPi may be selected. The candidates in the candidate list may be determined via several methods, which are not limited in the present disclosure. For example, the methods may be derived from VVC, e.g., inheriting affine motion vectors from the spatially neighboring blocks that use the affine mode to determine the candidate(s); filling with translational motion vectors from the spatially neighboring coding units to determine the candidate(s); determining the candidate(s) by using motion vectors from the temporally neighboring blocks with translational motion; and/or determining the candidate(s) by filling with zero motion vectors.

A difference may exist between the CPMVi and the corresponding CPMVPi. Such a difference may be referred to as a motion vector residual and may be denoted as MvdCpi. The CPMVi may be represented as:

$$CPMVi = CPMVPi + MvdCpi.$$

The one or more difference parameters (denoted as MvdCpi') may be determined or parsed from the video data in order to determine the MvdCpi. For example, a first difference parameter MvdCp0' may be used for determining the MvdCp0. For example, a second difference parameter MvdCp1' may be used for determining the MvdCp1. For a 6-parameter affine model, a third difference parameter MvdCp2', may be used for determining the MvdCp2.

Referring back to FIG. 3, at block 330, the process 300 (e.g., the decoder module 124) may determine the motion vectors of the first block unit based on the motion vector predictors of the first block unit, the one or more difference parameters, and the motion vector information of one or more second block units within the current frame stored in the electronic device 120. The one or more second block units may be adjacent to the first block unit. For example, the one or more second block units may be neighboring blocks of the first block unit.

The motion vector information of the one or more second block units may be stored in the electronic device 120 (e.g., in the decoded picture buffer 2246) and may include motion vector-related information that has been calculated or obtained for the one or more second block units. The motion vector-related information may include motion vectors, motion vector residuals, difference parameters, or other related data.

In some implementations, one of the one or more second block units may be coded in the affine AMVP mode. In such a case, the motion vector information may include motion vector residual(s) of the one of the one or more second block units. In some implementations, the decoder module 124 may determine the CPMV0 based on the CPMVP0, MvdCp0', and a motion vector residual MvdCp0$_{neig}$ (e.g., the motion vector residual of the control point at the top-left corner) of the one of the one or more second block units. In some implementations, the decoder module 124 may determine the CPMV1 based on the CPMVP1, MvdCp0', MvdCp1', MvdCp0$_{neig}$, and another motion vector residual MvdCp1$_{neig}$ (e.g., the motion vector residual of the control point at the top-right corner) of the one of the one or more second block units.

Specifically, the decoder module 124 may first determine the one of the one or more second block units that is coded in the affine AMVP mode.

Figure 5:
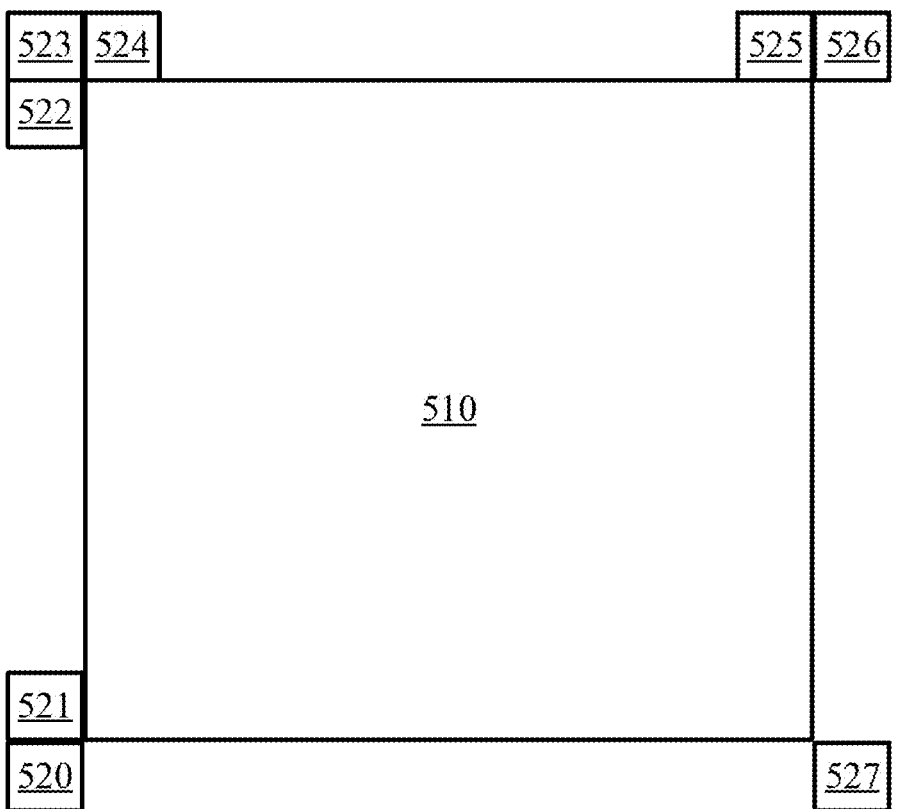
FIG. 5 is a schematic diagram illustrating multiple spatial adjacent block units, in accordance with one or more example implementations of this disclosure.

FIG. 5 is a schematic diagram illustrating multiple spatial adjacent block units, in accordance with one or more example implementations of this disclosure. With reference to FIG. 5, multiple second block units 520-527 are spatially adjacent to the first block unit 510.

In some implementations, the one of the one or more second block units may be indicated by an index. For instance, the decoder module 124 may read and parse the index from the video data, and select the one of the one or more second block units based on the index. For instance, the index may indicate a second block unit with a motion vector residual MvdCp0$_{neig}$ (e.g., the motion vector residual of the control point at the top-left corner) which is closest to the motion vector residual MvdCp0 (e.g., the motion vector residual of the control point at the top-left corner) of the first block unit.

In some implementations, a specific second block unit may be predefined, and selected, without the index. For instance, with reference to FIG. 5, the specific second block unit may be the second block unit 521 or the specific second block unit may be the second block unit 526.

In some implementations, the decoder module 124 may determine the one of the one or more second block units by determining whether each of the one or more second block units may be coded in the affine AMVP mode based on a predefined order, and by selecting the one of the one or more second blocks that is first determined to be coded in the affine AMVP mode. For instance, with reference to FIG. 5, the decoder module 124 may determine whether each of the one or more second block units is coded in the affine AMVP mode in a predefined order of (521, 525, 526, 520, 522), and may select the one of the one or more second block units that is first determined to be coded in the affine AMVP mode. It should be noted that the above-mentioned order and the second block units in the predefined order are merely illustrative and may be changed.

After the one of the one or more second block units coded in the affine AMVP mode is selected, the decoder module 124 may determine the CPMVi of the first block unit based on the CPMVPi, the one or more difference parameters, and the motion vector residuals of the selected second block units, where the motion vector residuals of the selected second block units may be obtained locally (e.g., from the decoded picture buffer 2246).

Under the same definition provided above, each motion vector residual (denoted as $MvdCpi_{neig}$) of the selected second block unit may be a difference between a motion vector (denoted as $CPMVi_{neig}$) of a control point of the second block unit and a motion vector predictor (denoted as $CPMVPi_{neig}$) of the control point of the selected second block unit. The $MvdCpi_{neig}$, $CPMVi_{neig}$, and $CPMVPi_{neig}$ may already be calculated/obtained and stored in the electronic device 120 (e.g., in the decoded picture buffer 2246).

In some implementations, the decoder module 124 may determine the CPMV0 of the first block unit based on the CPMVP0, MvdCp0', and $MvdCp0_{neig}$. For instance, the CPMV0 may be determined based on the following equation (1):

$$CPMV0 = CPMVP0 + MvdCp0 = CPMVP0 + MvdCp0' + MvdCp0_{neig} \quad (1)$$

In the above equation, the first difference parameter MvdCp0' may be a difference between the motion vector residual MvdCp0 of the control point (e.g., located at the top-left corner) of the first block unit and the motion vector residual $MvdCp0_{neig}$ of the corresponding control point (e.g., located at the top-left corner) of the selected second block unit. Compared to signaling the motion vector residual MvdCp0, signaling the MvdCp0' is more efficient and saves the signaling overhead.

In some implementations, the decoder module 124 may determine the CPMV1 of the first block unit based on CPMVP1, MvdCp1', MvdCp0, and $MvdCp1_{neig}$, where the MvdCp0 may be determined based on MvdCp0' and $MvdCp0_{neig}$. For instance, the CPMV1 may be determined based on the following equation (2):

$$CPMV1 = CPMVP1 + MvdCp1 = CPMVP1 + MvdCp1' + \quad (2)$$
$$MvdCp0 + MvdCp1_{neig} = CPMVP1 + MvdCp1' +$$
$$MvdCp0' + MvdCp0_{neig} + MvdCp1_{neig}$$

In the above equation, the second difference parameter MvdCp1' may be a difference between the motion vector residual MvdCp1 of the control point (e.g., located at the top-right corner) of the first block unit and a sum of the motion vector residual $MvdCp1_{neig}$ of the corresponding control point (e.g., located at the top-right corner) of the selected second block unit and the motion vector residual MvdCp0 of another control point (e.g., located at the top-left corner) of the first block unit calculated before for determining CPMV0. Compared to signaling the motion vector residual MvdCp1, signaling MvdCp1' is more efficient and saves the signaling overhead.

In some implementations, the decoder module 124 may determine CPMV0 of the first block unit based on CPMVP0, MvdCp0' and a difference parameter (denoted as $MvdCp0'_{neig}$) parsed from the video data for determining $MvdCp0_{neig}$. For instance, CPMV0 may be determined based on the following equation (3):

$$CPMV0 = CPMVP0 + MvdCp0 = CPMVP0 + MvdCp0' + MvdCp0'_{neig} \quad (3)$$

In the above equation, the first difference parameter MvdCp0' may be a difference between the motion vector residual MvdCp0 of the control point (e.g., located at the top-left corner) of the first block unit and the difference parameter (denoted as $MvdCp0'_{neig}$) that has been parsed from the video data for determining the motion vector residual $MvdCp0_{neig}$ of the corresponding control point (e.g., located at the top-left corner) of the selected second block unit. Compared to signaling the motion vector residual MvdCp0, signaling MvdCp0' is more efficient and saves the signaling overhead.

In some implementations, the decoder module 124 may determine CPMV1 of the first block unit based on CPMVP1, MvdCp1', MvdCp0, and a difference parameter (denoted as $MvdCp1'_{neig}$) parsed from the video data for determining $MvdCp1_{neig}$, where MvdCp0 is determined based on MvdCp0' and $MvdCp0_{neig}$. For instance, CPMV1 may be determined based on the following equation (4):

$$CPMV1 = CPMVP1 + MvdCp1 = CPMVP1 + MvdCp1' + \quad (4)$$
$$MvdCp0 + MvdCp1'_{neig} = CPMVP1 + MvpCp1' +$$
$$MvpCp0' + MvpCp0'_{neig} + MvpCp1'_{neig}$$

In the above equation, the second difference parameter MvdCp1' may be a difference between the motion vector residual MvdCp1 of the control point (e.g., located at the top-right corner) of the first block unit and a sum of the difference parameter (denoted as $MvdCp1'_{neig}$) parsed from the video data for determining the motion vector residual $MvdCp1_{neig}$ of the corresponding control point (e.g., located at the top-right corner) of the selected second block unit and the motion vector residual MvdCp0 of another control point (e.g., located at the top-left corner) of the first block unit calculated before for determining CPMV0. Compared to signaling the motion vector residual MvdCp1, signaling MvdCp1' is more efficient and saves the signaling overhead.

In some implementations, the decoder module 124 may determine CPMV1 of the first block unit based on CPMVP1, MvdCp1' and $MvdCp1_{neig}$, without information about MvdCp0. For instance, CPMV1 may be determined based on the following equation (5):

$$CPMV1 = CPMVP1 + MvdCp1 = CPMVP1 + MvdCp1' + MvdCp1_{neig} \quad (5)$$

In the above equation, the second difference parameter MvdCp1' may be a difference between the motion vector residual MvdCp1 of the control point (e.g., located at the top-right corner) of the first block unit and the motion vector residual $MvdCp1_{neig}$ of the corresponding control point (e.g., located at the top-right corner) of the selected second block unit. Compared to signaling the motion vector residual MvdCp1, signaling MvdCp1' is more efficient and saves the signaling overhead.

In some implementations, the decoder module 124 may determine CPMV1 of the first block unit based on CPMVP1, MvdCp1' and MvdCp1'$_{neig}$, without information about MvdCp0. For instance, CPMV1 may be determined based on the following equation (6):

$$CPMV1 = CPMVP1 + MvdCp1 = CPMVP1 + MvdCp1' + MvdCp1'_{neig} \quad (6)$$

In the above equation, the second difference parameter MvdCp1' may be a difference between the motion vector residual MvdCp1 of the control point (e.g., located at the top-right corner) of the first block unit and the difference parameter (denoted as MvdCp1'$_{neig}$) parsed from the video data for determining the motion vector residual MvdCp1$_{neig}$ of the corresponding control point (e.g., located at the top-right corner) of the selected second block unit. Compared to signaling the motion vector residual MvdCp1, signaling MvdCp1' is more efficient and saves the signaling overhead.

Other motion vectors (e.g., CPMV2 for the 6-parameter affine model) may be obtained as needed. For instance, CPMV2 may be determined based on any of the following equations (7)-(10):

$$CPMV2 = CPMVP2 + MvdCp2 \quad (7)$$
$$= CPMVP2 + MvdCp2' + MvdCp0 + MvdCp2_{neig}$$
$$CPMV2 = CPMVP2 + MvdCp2 \quad (8)$$
$$= CPMVP2 + MvdCp2' + MvdCp0 + MvdCp2'_{neig}$$
$$CPMV2 = CPMVP2 + MvdCp2 \quad (9)$$
$$= CPMVP2 + MvdCp2' + MvdCp2_{neig}$$
$$CPMV2 = CPMVP2 + MvdCp2 \quad (10)$$
$$= CPMVP2 + MvdCp2' + MvdCp2'_{neig}$$

In the above equations, MvdCp2$_{neig}$ represents the motion vector residual of the corresponding control point (e.g., located at the bottom-left corner) of the selected second block unit, and MvdCp2'$_{neig}$ represents the difference parameter parsed from the video data for determining the motion vector residual MvdCp2$_{neig}$ of the corresponding control point (e.g., located at the bottom-left corner) of the selected second block unit. Compared to signaling the motion vector residual MvdCp2, signaling the MvdCp2' is more efficient and saves the signaling overhead.

Advantageously, by utilizing the motion vector-related information of the selected second block unit (e.g., a selected neighboring block), the signaling required for determining the CPMVi may be reduced.

In some implementations, none of the second block units is coded in the affine AMVP mode. In such a case, the one or more second block units may be coded in a motion vector prediction (MVP) mode, and the motion vector information may include motion vector(s) of the one or more second block units, where the motion vector(s) of the one or more second block units may be also referred to as reference motion vector(s).

In some implementations, the decoder module 124 may determine the CPMVi of the first block unit based on the CPMVPi, MvdCpi', and a reference motion vector MV$_{ref}$ of one of the one or more second block units (e.g., also referred to as the reference block unit). For instance, the CPMVi may be determined based on the following equation (11):

$$CPMVi = CPMVPi + MvdCpi' + MV_{ref} \quad (11)$$

For example, with reference to FIG. 5, the reference block unit may be one of the top-left, top-right, and bottom-left neighboring blocks 523, 526, 520 of the first block unit 510.

For example, with reference to FIG. 5, one of the adjacent blocks 522, 523, 524 may be indicated to be the reference block unit by an index, where the index may be read and parsed from the video data.

In such a case, the difference parameters MvdCpi' may be a difference between the motion vector residual MvdCpi of the control point CPi of the first block unit and the motion vector of the corresponding control point (e.g., located at the position corresponding to "i") of the reference block unit. Compared to signaling the motion vector residuals MvdCpi, signaling the difference parameters MvdCpi' is more efficient and saves the signaling overhead.

In some implementations, the decoder module 124 may determine the CPMVi of the first block unit based on the CPMVPi, MvdCpi', and a statistical measure of the reference motion vector(s) of all or part of the one or more second block units. The statistical measure may be, for example, but not limited to, an average, a weighted average, a median, etc. It should be noted that, the present disclosure does not limit the second block unit(s) used for calculating the statistical measure.

For instance, the CPMVi may be determined based on the following equation (12):

$$CPMVi = CPMVPi + MvdCpi' + MV_{avg} \quad (12)$$

In the above equation, the MV$_{avg}$ represents an average of the reference motion vectors of all, or part, of the one or more second block units. For example, with reference to FIG. 5, the MV$_{avg}$ may be an average of the reference motion vectors of the second block units 523, 524, 520. However, the second block unit(s) used for calculating the average are not limited in the present disclosure.

For instance, the CPMVi may be determined based on the following equation (13):

$$CPMVi = CPMVPi + MvdCpi' + MV_{med} \quad (13)$$

In the above equation, the MV$_{med}$ represents a median of the reference motion vectors of all, or part, of the one or more second block units. For example, with reference to FIG. 5, the MV$_{med}$ may be a median of the reference motion vectors of the second block units 523, 524, 520. However, the second block unit(s) used for calculating the median are not limited in the present disclosure.

In the above mentioned cases, the difference parameters MvdCpi' may be a difference between the motion vector residual MvdCpi of the control point CPi of the first block unit and the statistical measure of the reference motion vector(s) of all, or part, of the one or more second block units. Compared to signaling the motion vector residuals MvdCpi, signaling the difference parameters MvdCpi' is more efficient and saves the signaling overhead.

According to the above discussed implementations, several enhanced signaling mechanisms for determining the CPMVi (e.g., in the affine AMVP mode) are described with reference to blocks 320 and 330 of FIG. 3.

In the following, multiple implementations will be described to introduce other improved signaling mechanisms for determining the CPMVi. In other words, blocks 320 and 330 (e.g., for determining the CPMVi) may be replaced by one or more of the following implementations.

In some implementations, a differential coding scheme may be adopted by the decoder module 124. In the differential coding scheme, a first motion vector residual MvdCp0 of the first block unit may be parsed from the video data. A first difference MvdCp1' between a second motion vector residual MvdCp1 of the first block unit and the first motion vector residual MvdCp0 may be parsed from the video data. For a 6-parameter affine model, a second difference MvdCp2' between a third motion vector residual MvdCp2 of the first block unit and the first motion vector residual MvdCp0 may be parsed from the video data.

Specifically, CPMVi may be determined based on the following equations (14)-(16):

$$CPMV0 = CPMVP0 + MvdCp0 \tag{14}$$

$$CPMV1 = CPMVP1 + MvdCp1 = CPMVP1 + MvdCp1' + MvdCp0 \tag{15}$$

$$CPMV2 = CPMVP2 + MvdCp2 = CPMVP2 + MvdCp2' + MvdCp0 \tag{16}$$

Compared to signaling all the motion vector residuals MvdCp0, MvdCp1, and MvdCp2, signaling the first motion vector residual MvdCp0 and the difference(s) MvdCp1' and McdCp2' is more efficient and saves the signaling overhead.

In some implementations, the decoder module 124 may first parse the first motion vector MvdCp0 from the video data, then determine whether the differential coding scheme is adopted based on the magnitude of the first motion vector residual MvdCp0. In a case that the differential coding scheme is not adopted, the decoder module 124 may determine that all the motion vector residual(s) of the first block unit are equal to the first motion vector residual MvdCp0. Consequently, no other information, except for the first motion vector residual MvdCp0, may need to be parsed/signaled.

Specifically, a first threshold may be preset for the decoder module 124, and the CPMVi may be determined based on a first pseudo code as in the following:

```
0:   First Pseudo Code
1:   read/parse/decode MvdCp0 from the video data;
2:   If MvdCp0 < first threshold:
3:       CPMV0 = CPMVP0 + MvdCp0;
4:       CPMV1 = CPMVP1 + MvdCp0;
5:       CPMV2 = CPMVP2 + MvdCp0;
6:   Otherwise:
7:       read/parse/decode MvdCp1' and MvdCp2' from the video data;
8:       CPMV0 = CPMVP0 + MvdCp0;
9:       CPMV1 = CPMVP1 + MvdCp1' + MvdCp0;
10:      CPMV2 = CPMVP2 + MvdCp2' + MvdCp0.
```

In some implementations, the decoder module 124 may be configured with a size threshold, and may determine, by comparing the size threshold with a current/neighboring block size, whether to determine the CPMVi based on the entire first pseudo code. In a case that the current/neighboring block size is smaller, or not larger, than the size threshold, the decoder module 124 may determine the CPMVi based on a default mechanism instead of the entire first pseudo code.

For example, the default mechanism may include lines 1 and 3-5 of the first pseudo code, or may include lines 1, and 7-10 of the first pseudo code.

For example, the size threshold may be an area threshold (e.g., width*height), such as 8 px*8 px, 8 px*4 px, 4 px*8 px, or 4 px*4 px. For example, the size threshold may be a length threshold (e.g., width or height).

Advantageously, the signaling may be further reduced while maintaining the prediction accuracy.

In some implementations, the decoder module 124 may determine whether the differential coding scheme is adopted further based on a flag.

Specifically, in a case that the decoder module 124 determines that the first motion vector residual MvdCp0 is not smaller than the first threshold, the decoder module 124 may further parse the flag from the video data for determining whether the differential coding scheme is adopted. Thus, the CPMVi may be determined based on a second pseudo code as in the following:

```
0:   Second Pseudo Code
1:   read/parse/decode MvdCp0 from the video data;
2:   If MvdCp0 < first threshold:
3:       CPMV0 = CPMVP0 + MvdCp0;
4:       CPMV1 = CPMVP1 + MvdCp0;
5:       CPMV2 = CPMVP2 + MvdCp0;
6:   Otherwise:
7:       read/parse/decode flag from the video data;
8:       If flag == first value:
9:           CPMV0 = CPMVP0 + MvdCp0;
10:          CPMV1 = CPMVP1 + MvdCp0;
11:          CPMV2 = CPMVP2 + MvdCp0;
12:      Otherwise:
13:          read/parse/decode MvdCp1' and MvdCp2' from the video data;
14:          CPMV0 = CPMVP0 + MvdCp0;
15:          CPMV1 = CPMVP1 + MvdCp1' + MvdCp0;
16:          CPMV2 = CPMVP2 + MvdCp2' + MvdCp0.
```

For example, in a case that a difference between the MvdCp1/MvdCp2 and MvdCp0 is smaller than a second threshold, the MvdCp1/MvdCp2 may not be encoded into the bitstream by the encoder. Instead, the flag may be set to the first value and signaled to the decoder.

In some implementations, the decoder module 124 may be configured with a size threshold, and may determine, by comparing the size threshold with a current/neighboring block size, whether to determine the CPMVi based on the entire second pseudo code. In a case that the current/neighboring block size is smaller, or not larger, than the size threshold, the decoder module 124 may determine the CPMVi based on a default mechanism instead of the entire second pseudo code.

For example, the default mechanism may include lines 1 and 3-5 of the second pseudo code. That is, the decoder module 124 may not decode the flag in a case that the current/neighboring block size is smaller, or not larger, than the size threshold.

For example, the size threshold may be an area threshold (e.g., width*height), such as 8 px*8 px, 8 px*4 px, 4 px*8 px, or 4 px*4 px. For example, the size threshold may be a length threshold (e.g., width or height).

Advantageously, the signaling may be reduced and the efficiency may be improved.

In some implementations, the decoder module 124 may first parse the first motion vector MvdCp0 and a flag from the video data, then determine whether the differential coding scheme is adopted based on the flag. In a case that the differential coding scheme is not adopted, the decoder module 124 may determine that all the motion vector residual(s) of the first block unit are equal to the first motion vector residual MvdCp0. Consequently, no other information except for the first motion vector residual MvdCp0 needs to be parsed/signaled.

Specifically, the CPMVi may be determined based on a third pseudo code as in the following:

```
 0:  Third Pseudo Code
 1:  read/parse/decode flag and MvdCp0 from the video data;
 2:  If flag == first value:
 3:      CPMV0 = CPMVP0 + MvdCp0;
 4:      CPMV1 = CPMVP1 + MvdCp0;
 5:      CPMV2 = CPMVP2 + MvdCp0;
 6:  Otherwise:
 7:      read/parse/decode MvdCp1' and MvdCp2' from the video data;
 8:      CPMV0 = CPMVP0 + MvdCp0;
 9:      CPMV1 = CPMVP1 + MvdCp1' + MvdCp0;
10:      CPMV2 = CPMVP2 + MvdCp2' + MvdCp0.
```

In some implementations, the decoder module 124 may be configured with a size threshold, and determine, by comparing the size threshold with a current/neighboring block size, whether to determine the CPMVi based on the entire third pseudo code. In a case that the current/neighboring block size is smaller, or not larger than, the size threshold, the decoder module 124 may determine the CPMVi based on a default mechanism instead of the entire third pseudo code.

For example, the default mechanism may include lines 1 and 3-5 of the third pseudo code. That is, the decode module 124 does not decode the flag in a case that the current/neighboring block size is smaller or not larger than the size threshold.

For example, the size threshold may be an area threshold (e.g., width*height), such as 8 px*8 px, 8 px*4 px, 4 px*8 px, or 4 px*4 px. For example, the size threshold may be a length threshold (e.g., width or height).

Advantageously, the signaling may be reduced and the efficiency may be improved.

Returning to FIG. 3, at block 340, the decoder module 124 may reconstruct the first block unit based on the motion vectors of the first block unit and a reference frame included in the multiple image frames.

In some implementations, the mode information may further include an index for indicating the reference frame from the multiple image frames.

In some implementations, once the motion vectors CPMVi of the control points of the first block unit are determined, the decoder module 124 may reconstruct the first block unit based on the motion vectors CPMVi and the reference frame using the affine AMVP mode.

In some implementations, the decoder module 124 may calculate the affine transformation parameters (e.g., the affine transformation matrix, translation vector, etc.) by using the CPMVi, and may apply the affine transformation parameters to each pixel of the current block (e.g., the first block unit) to determine a corresponding position in the reference frame. Afterwards, a predicted block corresponding to the current block may be generated based on the reference frame using different methods, such as a bilinear interpolation. As such, the current block may be reconstructed by adding pixel values of the predicted block and the residuals (e.g., which may be decoded from the video data) of the current block.

Referring back to FIG. 3, once the first block unit is reconstructed, the method/process 300 may then end. By repeating the method/process 300, the multiple image frames included in the video data may be reconstructed.

Figure 6:
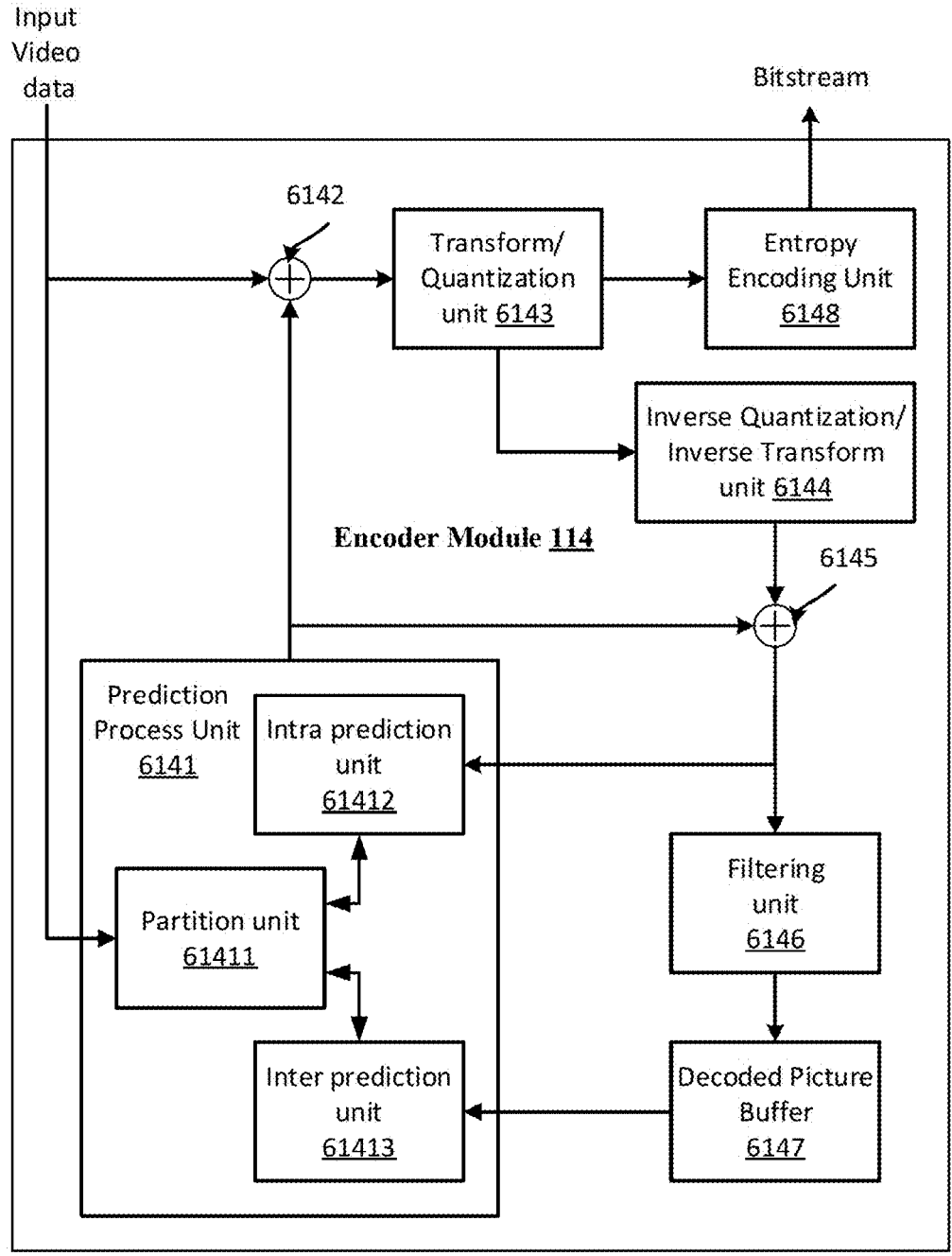
FIG. 6 is a block diagram illustrating an encoder module of the first electronic device illustrated in FIG. 1, in accordance with one or more example implementations of this disclosure.

FIG. 6 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 6141), at least a first summer (e.g., a first summer 6142) and a second summer (e.g., a second summer 6145), a transform/quantization processor (e.g., a transform/quantization unit 6143), an inverse quantization/inverse transform processor (e.g., an inverse quantization/inverse transform unit 6144), a filter (e.g., a filtering unit 6146), a decoded picture buffer (e.g., a decoded picture buffer 6147), and an entropy encoder (e.g., an entropy encoding unit 6148). The prediction processing unit 6141 of the encoder module 114 may further include a partition processor (e.g., a partition unit 61411), an intra prediction processor (e.g., an intra prediction unit 61412), and an inter prediction processor (e.g., an inter prediction unit 61413).

The encoder module 114 may receive the source video and encode the source video to output a bitstream. The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 6141 may receive a current image block of a specific one of the image frames. The current image block may be the luminance block or one of the chrominance blocks in the specific image frame.

The partition unit 61411 may divide the current image block into multiple block units. The intra prediction unit 61412 may perform intra-predictive coding of a current block unit relative to one or more neighboring blocks in the same frame as the current block unit in order to provide spatial prediction. The inter prediction unit 61413 may perform inter-predictive coding of the current block unit relative to one or more blocks in one or more reference image blocks to provide temporal prediction.

The prediction processing unit 6141 may select one of the coding results generated by the intra prediction unit 61412 and the inter prediction unit 61413 based on a mode selection method, such as a cost function. The mode selection method may be a rate-distortion optimization (RDO) process.

The prediction processing unit 6141 may determine the selected coding result and provide a predicted block corresponding to the selected coding result to the first summer 6142 for generating a residual block and to the second summer 6145 for reconstructing the encoded block unit. The prediction processing unit 6141 may further provide syntax elements, such as motion vectors, intra-mode indicators, partition information, and/or other syntax information, to the entropy encoding unit 6148.

The intra prediction unit 61412 may intra-predict the current block unit. The intra prediction unit 61412 may determine an intra prediction mode directed toward a reconstructed sample neighboring the current block unit in order to encode the current block unit.

The intra prediction unit 61412 may encode the current block unit using various intra prediction modes. The intra prediction unit 61412 of the prediction processing unit 6141 may select an appropriate intra prediction mode from the selected modes. The intra prediction unit 61412 may encode the current block unit using a cross-component prediction mode to predict one of the two chroma components of the current block unit based on the luma components of the current block unit. The intra prediction unit 61412 may predict a first one of the two chroma components of the current block unit based on the second of the two chroma components of the current block unit.

The inter prediction unit 61413 may inter-predict the current block unit as an alternative to the intra prediction performed by the intra prediction unit 61412. The inter prediction unit 61413 may perform motion estimation to estimate motion of the current block unit for generating a motion vector.

The motion vector may indicate a displacement of the current block unit within the current image block relative to a reference block unit within a reference image block. The inter prediction unit 61413 may receive at least one reference image block stored in the decoded picture buffer 6147 and estimate the motion based on the received reference image blocks to generate the motion vector.

The first summer 6142 may generate the residual block by subtracting the prediction block determined by the prediction processing unit 6141 from the original current block unit. The first summer 6142 may represent the component or components that perform this subtraction.

The transform/quantization unit 6143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 6143 may perform a scan of the matrix including the quantized transform coefficients. Alternatively, the entropy encoding unit 6148 may perform the scan.

The entropy encoding unit 6148 may receive multiple syntax elements from the prediction processing unit 6141 and the transform/quantization unit 6143, including a quantization parameter, transform data, motion vectors, intra modes, partition information, and/or other syntax information. The entropy encoding unit 6148 may encode the syntax elements into the bitstream.

The entropy encoding unit 6148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 6144 may apply inverse quantization and inverse transformation to reconstruct the residual block in the pixel domain for later use as a reference block. The second summer 6145 may add the reconstructed residual block to the prediction block provided by the prediction processing unit 6141 in order to produce a reconstructed block for storage in the decoded picture buffer 6147.

The filtering unit 6146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 6145.

The decoded picture buffer 6147 may be a reference picture memory that stores the reference block to be used by the encoder module 114 to encode video, such as in intra-coding or inter-coding modes. The decoded picture buffer 6147 may include a variety of memory devices, such as DRAM (e.g., including SDRAM), MRAM, RRAM, or other types of memory devices. The decoded picture buffer 6147 may be on-chip with other components of the encoder module 114 or off-chip relative to those components.

The method/process 300 for decoding/encoding video data may be performed by the first electronic device 110. The encoder module 114 may receive the video data. The video data received by the encoder module 114 may be a video. The encoder module 114 may determine a first block unit from a current image from according to the video data. The encoder module 114 may divide the image frame to generate multiple CTUs, and further divide one of the CTUs to determine the first block unit according to one of multiple partition schemes based on any video coding standard.

The encoder module 114 may establish a candidate list for the CPMVPi of the first block unit, and select the best candidates as the CPMVPi from the candidate list. When the encoder module 114 encode mode information into the bitstream, the encoder module 114 may include, in the mode information, an index list for indicating the CPMVPi from the candidate list. In addition, the mode information may further specify a prediction mode selected by the encoder module 114 for the first block unit, and may include an index for indicating one or more reference frames.

The encoder module 114 may determine, based on the video data, motion the vector residual(s) (e.g., MvdCpi) based on actual motion vectors (e.g., from the video data) and the CPMVPi. The encoder module 114 may further determine the one or more difference parameters (e.g., MvdCpi') for the first block unit based on the motion vector residual(s) and motion vector information of one or more second block units which are adjacent to the first block unit. For example, the encoder module 114 may determine the one or more difference parameters based on one or more of the equations (1) to (16), as described above. For example, the encoder module 114 may encode the one or more difference parameters, instead of all the motion vector residual(s), into the bitstream.

In some implementations, the encoder module 114 may further include the flag(s), as described above, into the bitstream. In some implementations, the encoder module 114 may compare the current/neighboring block size with the size threshold, then determine whether to include the flag(s) into the bitstream based on the comparison result.

The encoder module 114 may then add the encoded data, including the flags and the indices, into the bitstream for providing to the decoder module 124.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method for decoding video data performed by an electronic device, the method comprising:

receiving the video data comprising a plurality of image frames;

parsing the video data to determine a first difference parameter for a first block unit within a current frame of the plurality of image frames;

determining a first motion vector of the first block unit based on a first motion vector prediction of the first block unit, the first difference parameter, and motion vector information of one or more second block units within the current frame stored in the electronic device, wherein the one or more second block units are adjacent to the first block unit and one of the one or more second block units is coded in an affine advanced motion vector prediction (AMVP) mode; and reconstructing the first block unit based on the first motion vector and a reference frame included in the plurality of image frames, wherein:

determining the first motion vector comprises calculating the first motion vector of a first control point of the first block unit based on the first motion vector prediction, the first difference parameter, and a first motion vector residual of a second control point of the one of the one or more second block units, the second control point is associated with the first control point, and the first motion vector residual comprises a difference between a motion vector of the second control point and a motion vector prediction of the second control point.

2. The method according to claim 1, further comprising:

parsing the video data to further determine a second difference parameter for the first block unit within the current frame;

determining a second motion vector of the first block unit based on a second motion vector prediction of the first block unit, the first difference parameter, the second difference parameter, and the motion vector information, wherein reconstructing the first block unit comprises reconstructing the first block unit based on the first motion vector and the reference frame, and further based on the second motion vector.

3. The method according to claim 1, wherein the first difference parameter comprises a difference between a second motion vector residual of the first control point of the first block unit and the first motion vector residual.

4. The method according to claim 1, wherein determining the first motion vector of the first block unit further comprises:

parsing the video data to determine an index; and selecting the one of the one or more second block units based on the index.

5. The method according to claim 1, wherein determining the first motion vector of the first block unit further comprises:

determining whether each of the one or more second block units is coded in the affine AMVP mode based on a predefined order; and selecting the one of the one or more second block units that is first determined to be coded in the affine AMVP mode.

6. The method according to claim 1, further comprising:

determining that the first block unit is coded in the AMVP mode.

7. An electronic device for decoding video data, the electronic device comprising:

at least one processor; and at least one non-transitory computer-readable medium coupled to the at least one processor and storing one or more computer-executable instructions that, when executed by the at least one processor, cause the electronic device to:

receive the video data comprising a plurality of image frames;

parse the video data to determine a first difference parameter for a first block unit within a current frame of the plurality of image frames;

determine a first motion vector of the first block unit based on a first motion vector prediction of the first block unit, the first difference parameter, and motion vector information of one or more second block units within the current frame stored in the electronic device, wherein the one or more second block units are adjacent to the first block unit and one of the one or more second block units is coded in an affine advanced motion vector prediction (AMVP) mode; and reconstruct the first block unit based on the first motion vector and a reference frame included in the plurality of image frames, wherein:

determining the first motion vector of the first block unit comprises calculating the first motion vector of a first control point of the first block unit based on the first motion vector prediction, the first difference parameter and a first motion vector residual of a second control point of the one of the one or more second block units, the second control point is associated with the first control point, and the first motion vector residual comprises a difference between a motion vector of the second control point and a motion vector prediction of the second control point.

8. The electronic device according to claim 7, wherein the one or more computer-executable instructions, when executed by the at least one processor, further cause the electronic device to:

parse the video data to further determine a second difference parameter for the first block unit within the current frame;

determine a second motion vector of the first block unit based on a second motion vector prediction of the first block unit, the first difference parameter, the second difference parameter, and the motion vector information, wherein reconstructing the first block unit comprises reconstructing the first block unit based on the first motion vector and the reference frame, and further based on the second motion vector.

9. The electronic device according to claim 7, wherein the first difference parameter comprises a difference between a second motion vector residual of the first control point of the first block unit and the first motion vector residual.

10. The electronic device according to claim 7, wherein determining the first motion vector of the first block unit further comprises:

parsing the video data to determine an index; and selecting the one of the one or more second block units based on the index.

11. The electronic device according to claim 7, wherein determining the first motion vector of the first block unit further comprises:

determining whether each of the one or more second block units is coded in the affine AMVP mode based on a predefined order; and selecting the one of the one or more second block units that is first determined to be coded in the affine AMVP mode.

12. The electronic device according to claim 7, wherein the one or more computer-executable instructions, when executed by the at least one processor, further cause the electronic device to:

determine that the first block unit is coded in the AMVP mode.

\* \* \* \* \*